Oct. 2, 1962 V. W. BREITENSTEIN 3,056,615
JOINT HAVING TEMPERATURE RESPONSIVE SEALING MEANS
Original Filed March 28, 1957 2 Sheets-Sheet 1
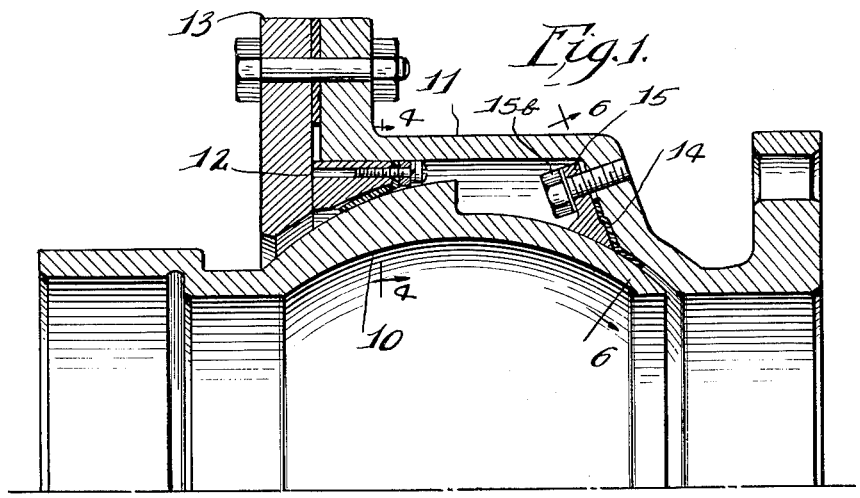
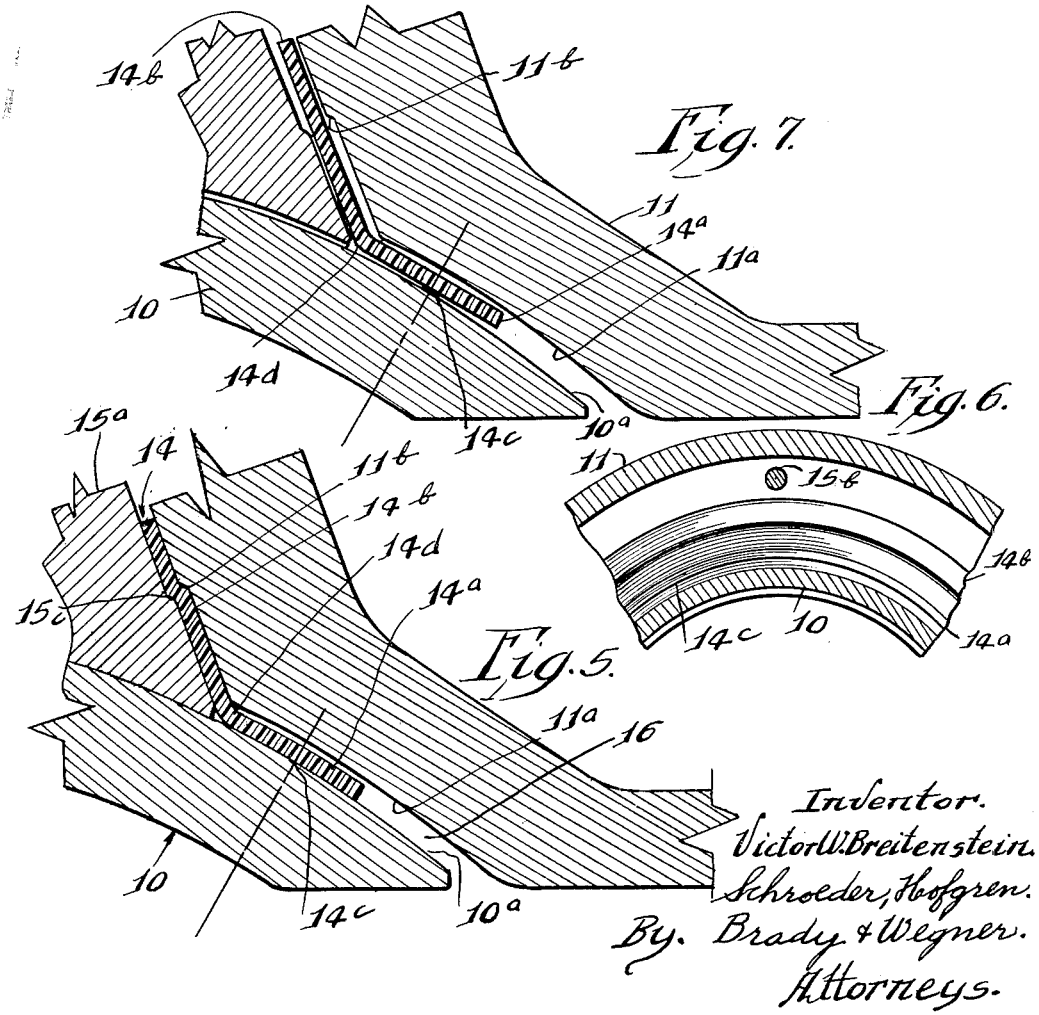
Inventor.
Victor W. Breitenstein.
Schroeder, Hofgren.
By Brady & Wegner.
Attorneys.

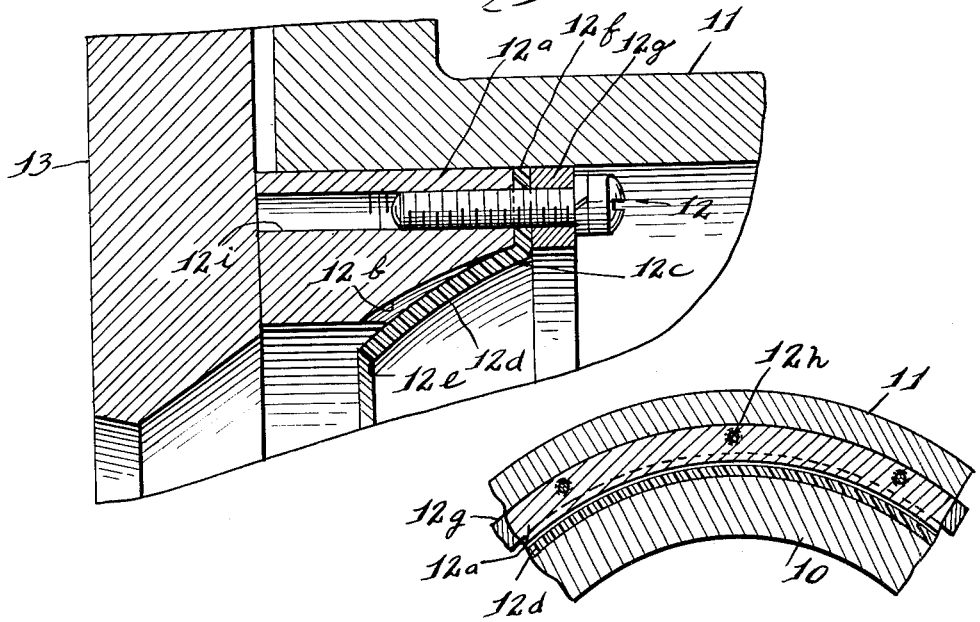
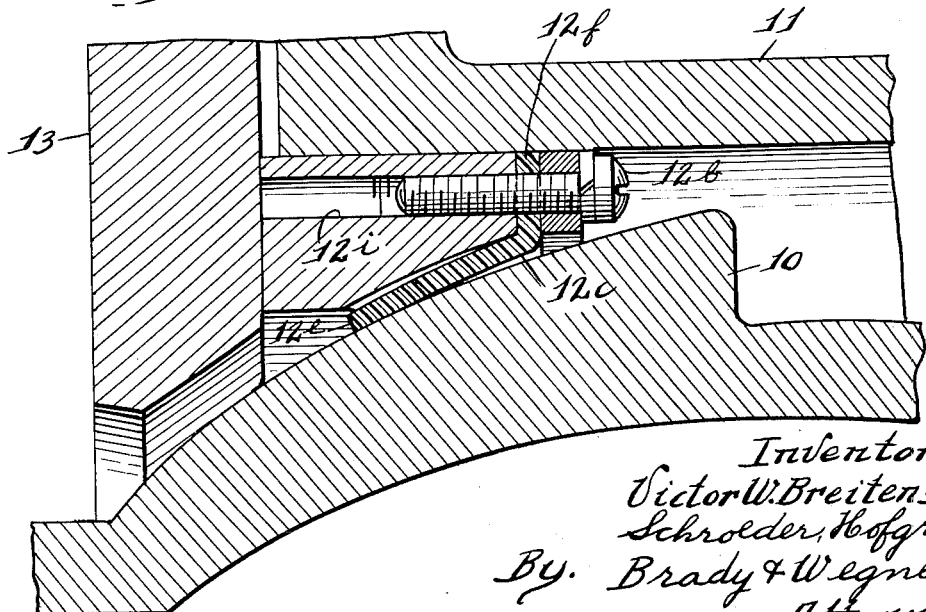

United States Patent Office 3,056,615
Patented Oct. 2, 1962

3,056,615
JOINT HAVING TEMPERATURE RESPONSIVE
SEALING MEANS
Victor W. Breitenstein, Arlington Heights, Ill., assignor to Francis N. Bard
Continuation of application Ser. No. 649,135, Mar. 28, 1957. This application June 1, 1960, Ser. No. 33,061
1 Claim. (Cl. 285—187)

This invention relates to joints and in particular to ball joints.

This application is a continuation of my application Serial No. 649,135, filed March 28, 1957 (now abandoned), which application was in turn a continuation-in-part of my copending application Serial No. 594,511, filed June 28, 1956, now issued as U.S. Letters Patent No. 2,864,630 dated December 16, 1958, to which reference may be made for details of the structure and arrangement not fully described herein.

There is today an increasing number of applications wherein ball joints are required to operate under rigorous conditions such as over a substantial range of temperatures and where substantial forces are encountered. A serious problem in such joints is that heretofore seals provided therein have tended to lose their sealing effect at extremely low or high temperatures. To solve this problem, complicated and costly means have been employed, none of which has proven completely satisfactory.

Another serious problem in known ball joints is that the rigid nature of the ball and ball seat prevents proper support of the ball, and the interaction of the ball and ball seat under heavy stresses causes galling of the abutting surfaces thereof.

I have devised and herein disclose and claim a new and improved flexible ball joint operable at high pressures and having sealing means operable over a substantial range of temperatures including extremely low temperatures.

A principal feature of the invention is the provision of a new and improved low temperature seal.

Another feature is that the seal comprises a thin, annular element arranged to be conformably disposed around an inner, segmentally spherical member such as a ball member of a joint and is formed of a material having a high coefficient of expansion, whereby the seal is constricted around the ball member at low temperatures.

A further feature is that the seal comprises an initially frusto-conical element having an inner diameter substantially smaller than the diameter of the ball with an outer portion thereof being fixedly, sealingly secured to the joint casing and an inner portion being bent or flexed from the outer portion to be disposed generally circumferentially around the ball and urged into sealing engagement therewith.

Still another feature of the invention is that the outer or casing member is provided with an inner, arcuate surface spaced concentrically from the ball surface with the inner seal portion being received therebetween.

A further feature of the invention is the provision in a ball joint of a new and improved ball seat.

A yet further feature is that the ball seat includes a rigid annular member and means precluding galling of said annular member by the ball, comprising a liner between the member and the ball.

Other features and advantages of the invention will be apparent from the following description taken in connection with the accompanying drawings wherein:

FIG. 1 is a fragmentary, longitudinal, sectional view of a ball joint embodying the invention;

FIG. 2 is an enlarged, fragmentary sectional view of the bearing means prior to the insertion of the ball;

FIG. 3 is a section similar to that of FIG. 2, but with the ball in the joint-assembled position;

FIG. 4 is an enlarged, fragmentary sectional view taken approximately along the line 4—4 of FIG. 1;

FIG. 5 is an enlarged, fragmentary section of the joint showing the seal in greater detail;

FIG. 6 is an enlarged, fragmentary sectional view taken approximately along the line 6—6 of FIG. 1; and FIG. 7 is a section similar to that of FIG. 5 but with the joint elements as arranged just prior to completing the installation of the seal.

In the exemplary embodiment of the invention as disclosed in the drawings, a flexible ball joint is seen to comprise a first ball member 10 movably associated with a second outer casing member 11. Improved bearing means 12 for supporting ball 10 and for transmitting thrust between ball 10 and casing 11 are retained in place by a suitable nut 13. Nut 13 may be of conventional construction well known in the art and requires no further description here.

Means for movably sealing ball 10 to the casing 11 comprise a seal 14 sealingly secured to the casing by a suitable clamp 15. The seal is arranged to extend into engagement with the ball and is constricted therearound at low temperatures to effect a tight sealing engagement therewith.

Referring now more specifically to FIGS. 2 through 4, bearing means 12 is seen to comprise a rigid ring 12a, preferably formed of a metal, having an inner segmentally spherical surface 12b spaced concentrically outwardly of ball 10. Extending into the space between ring 12a and ball 10 is an annular liner 12c. The liner comprises an inner portion 12d having an arcuate cross section, the diameter of one end 12e thereof being normally slightly smaller than the portion of the ball 10 with which end 12e is arranged to abut. The opposite end of the liner is provided with a laterally outwardly extending flange portion 12f which is fixedly secured to ring 12a by means of a clamping ring 12g and suitable bolts 12h passed through the clamping ring and into a threaded recess 12i.

Liner 12c is formed of a wear resistant, resilient material having preferably a low coefficient of friction, an example of such material being Kel-F (trifluorochloroethylene polymer). In its unflexed condition, first portion 12d of the liner is disposed as seen in FIG. 2. However, when ball 10 is arranged within bearing means 12, the outer portion 12e of the liner is expanded into the assembled configuration shown in FIG. 3. Thus, the liner is firmly engaged with the ball to provide a proper support thereof, and, due to its antifriction characteristic the liner precludes galling of the surfaces of the ball 10 and bearing ring 12a which it engages.

Referring now more specifically to FIGS. 5 and 7, seal 14 is seen to comprise a thin walled annular element having an inner frusto-conical portion 14a. An outer frusto-conical portion 14b of greater angularity than portion 14a extends generally outwardly from portion 14a to be sealed against casing 11 by means of a clamp ring 15a secured to the casing by suitable means such as bolts 15b. The term "outwardly" as used herein refers to that direction extending away from the center of ball surface 10a, and "inwardly" is the converse thereof.

Seal portion 14a is arranged so that when ball 10 is moved toward casing 11 the ball first contacts seal portion 14a along a central line 14c of portion 14a. Thus portion 14a extends substantially tangentially to ball 10 at the time of contact. Subsequent pressure, however, by the ball against portion 14a causes portion 14a to flex or bend at its connection 14d to outer portion 14b and to deform resiliently into facial, sealing engagement with the ball surface 10a.

Seal 14 is preferably formed of a material having a high coefficient of expansion, examples of suitable materials being Teflon (tetrafluoroethylene polymer) and Kel-F (trifluorochloroethylene polymer). Ball 10 is formed of metal or other material having a relatively lower coefficient of expansion, and, thus, at lower temperatures inner portion 14a of the seal contracts or constricts substantially more than does ball 10, as best seen in FIG. 5. This effectively maintains the desired sealing engagement of the seal against the ball down to the lowest temperatures normally encountered in the operation of such joints.

The inner surface 11a of casing 11 which is juxtaposed to ball surface 10a is spaced concentrically outwardly therefrom. The resulting space 16 between said surfaces accommodates expansion of inner seal portion 14a at higher temperatures. Casing 11 may be formed of a metal or other material having a coefficient of expansion lower than that of the seal and thus as the temperature rises seal portion 14a tends to expand and fill more completely space 16. This, in effect, causes the seal to be pressed forcibly between surfaces 10a and 11a and maintains the desired sealing pressure against surface 10a.

To provide improved holding action of the clamp means, ring 15a and casing 11 are provided with complementary annular shoulders 15c and 11b, respectively, which pinch the seal outer portion 14b slightly.

While I have shown and described certain features of the invention, it is to be understood that it is capable of many modifications. Changes, therefore, in the construction and arrangement may be made without departing from the spirit and scope of the invention as defined in the appended claim.

I claim:

A joint having a segmentally, spherical ball member, an outer casing member having an inner surface concentrically spaced from the outer surface of said ball member, means slidably contacting the outer surface of the ball member and secured to the casing member for mounting said surfaces in spaced parallel relationship, and means of the character described for effecting a seal between the ball member and the casing member comprising a thin, resiliently flexible seal provided with a first portion sealingly secured to the casing member and extending to a point adjacent the ball member and said seal having a second portion bent from the first portion to extend therefrom around the ball member in the space between said surfaces, said second portion of the seal having an inner surface generally in the shape of a section of a sphere and normally sealingly contacting the confronting surface of the ball member and an outer surface normally slightly spaced from the adjacent inner surface of the casing member, said seal material having the physical property of remaining flexible at an extremely low temperature, such as tetrafluoroethylene polymer, the coefficient of expansion of said ball and casing members being less than the coefficient of expansion of the seal whereby said second portion of the seal forcibly constricts itself about the adjacent surface of the ball member at low temperatures, and said space between said surfaces being sufficiently narrow at the location of the second portion of the seal whereby said second portion expands into contact with said surfaces as the temperature rises, thereby to provide sealing engagement of the seal with said casing and ball member over a substantial range of temperatures.

References Cited in the file of this patent

UNITED STATES PATENTS

| | | |
|---|---|---|
| 848,169 | Hawley | Mar. 26, 1907 |
| 1,076,962 | Doble | Oct. 28, 1913 |
| 1,690,839 | Roth | Nov. 6, 1928 |
| 2,681,257 | Niesemann | June 15, 1954 |